United States Patent
Trantow

(10) Patent No.: US 6,552,536 B2
(45) Date of Patent: Apr. 22, 2003

(54) REFERENCE STANDARD FOR INSPECTION OF DUAL-LAYERED COATINGS

(75) Inventor: Richard L. Trantow, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/173,181

(22) Filed: Jun. 17, 2002

(65) Prior Publication Data

US 2003/0008065 A1 Jan. 9, 2003

Related U.S. Application Data

(63) Continuation of application No. 09/563,974, filed on May 3, 2000, now abandoned.

(51) Int. Cl.[7] .................. G01R 33/14; G01R 35/00; G01N 27/84; B32B 15/04; B32B 9/04
(52) U.S. Cl. .................. 324/222; 324/202; 324/216; 324/229; 428/469; 428/486; 428/336
(58) Field of Search ................ 324/202, 216, 324/229, 222; 428/469, 216, 486, 336; 209/577

(56) References Cited

U.S. PATENT DOCUMENTS

| 3,781,090 | A | * | 12/1973 | Sumita | 359/588 |
|---|---|---|---|---|---|
| 4,333,983 | A | * | 6/1982 | Allen | 428/336 |
| 4,387,960 | A | * | 6/1983 | Tani | 359/588 |
| 4,418,315 | A | * | 11/1983 | Edwards et al. | 324/202 |
| 5,188,887 | A | * | 2/1993 | Linge et al. | 428/216 |
| 5,837,383 | A | * | 11/1998 | Wenzel et al. | 428/486 |
| 5,847,562 | A | * | 12/1998 | Fulton et al. | 324/229 |
| 6,060,677 | A | * | 5/2000 | Ulrichsen et al. | 209/577 |
| 6,214,473 | B1 | * | 5/2001 | Hunt et al. | 428/469 |

* cited by examiner

Primary Examiner—Christine Oda
Assistant Examiner—Wasseem H. Hamdan
(74) Attorney, Agent, or Firm—V.G. Ramaswamg; Barbara Joan Haushalter

(57) ABSTRACT

A reference standard and method for inspecting dual-layered coatings. The reference standard has a first layer adherent to a substrate, the first layer has a predetermined thickness that increases in one direction. Adherent to the first layer is a second layer, the second layer has a predetermined thickness that increases in a direction orthogonal with the first layer. The orientation of the first and second layers of the reference standard provides a spectrum of the possible variations of the dual-layered coating.

10 Claims, 2 Drawing Sheets

REFERENCE STANDARD FOR INSPECTION OF DUAL-LAYERED COATINGS

This application is a continuation of application Ser. No. 09/563,974, filed May 3, 2000, now abandoned.

TECHNICAL FIELD

The present invention relates to dual-layered coatings and, more specifically, to a reference standard used for inspecting dual-layered coatings.

BACKGROUND OF THE INVENTION

Coating systems are employed though out gas turbine engines. Coating systems may provide protection from elements present in gas turbine engine environment. Environmental elements include interference rubs and thermal protection.

Components, such as seal teeth, employ coatings to improve wear characteristics and extend the life of the component. In general, coating systems on seal teeth comprise a bond layer deposited on the component surface, covered by an adherent wear layer.

Other components, such as turbine blades in a gas turbine engine, commonly bear a thermal barrier coating (TBC) system which protects the components from hot gases present in the engine. The TBC protects the metal of the components from high temperatures by inhibiting heat transfer from the hot gases into the metal. That is, the metal dissipates heat rapidly while the TBC conducts heat into the material slowly. Thus, the temperature of the metal is lower than that of the TBC. Therefore, the gases can be hotter, allowing the engine to employ a more efficient thermodynamic cycle.

To be effective, a TBC must have low thermal conductivity, strongly adhere to the component, and remain adherent to the component throughout many heating and cooling cycles. The latter requirement is particularly demanding due to the different coefficients of thermal expansion between materials having low thermal conductivity and superalloy materials typically used to form turbine engine components. TBC systems capable of satisfying the above requirements have generally required a metallic bond layer deposited on the component surface, covered by an adherent ceramic layer that serves to thermally insulate the component.

The thicknesses of the individual layers of coating systems are critical for optimal performance. Depositing the specific layers of coatings to the desired thicknesses requires a capability to measure the individual thickness of the coating system.

Current methods of thickness measurement present difficulties. Three examples of difficulties are following. One, direct measurement, as by sawing through a component to expose a cross section of the coating system and then measuring the layer thickness, damages the component. Two, ultrasonic thickness measurement is not feasible because many of the coating systems are porous and disperse the ultrasonic energy. Three, computer aided X-ray tomography does not provide sufficient precision to measure the desired coating system thicknesses.

Non-destructive methods are available to provide accurate coating system thickness measurement. For example, eddy current or infrared inspection techniques are available to determine the thickness of individual layers of a coating system on an component. However, both of these techniques require a reference standard for use as a benchmark. That is, the reference standard is used to compare the measured data of the component having unknown coating system characteristics with a reference standard having known coating system characteristics.

Previous methods of inspecting coating systems required the preparation of a many different reference samples. Each sample would reveal distinct characteristics of one combination of bond and wear or ceramic layer thickness; that is, each sample comprised a reference for that unique bond and wear or ceramic layer thickness combination. Numerous factors, such as cost, prohibited producing an entire spectrum of samples. Consequently, the measurement of the unknown coating system had to be interpolated among the samples. In other words, inspection depended on interpolation of data to fill the gaps between many individual reference samples. Moreover, each new combination of substrate, bond and wear or ceramic materials required new samples.

Accordingly, it is desired to provide an improved reference standard and method for inspecting components with dual-layered coatings.

BRIEF SUMMARY OF THE INVENTION

A reference standard and method for the inspection of dual-layered coatings. The reference standard provides a spectrum of the dual-layer coating variation. In one embodiment, the reference standard includes a first layer adherent to a substrate and second layer adherent to the first layer. At least of one of the first or second layers includes a predetermined thickness variation. The reference standard may be employed with inspection techniques that compare the unknown dual-layered coating thicknesses to the reference standard. Such techniques include eddy current and infrared inspection.

BRIEF DESCRIPTION OF THE DRAWINGS

The structure, operation and advantages of the presently preferred embodiment of this invention will become apparent upon consideration of the following description, taken in conjunction with the accompanying figures in which like reference characters refer to like elements, and in which.

DETAILED DESCRIPTION OF THE INVENTION

The present invention is generally applicable to inspection of components that operate within the environment of a gas turbine engine. Characteristics of the environment include relatively high temperatures, and are therefore subjected to severe thermal stresses and thermal cycling. Notable examples of such components include high and low pressure turbine nozzles and blades, shrouds, combustor liners and augmentor hardware of gas turbine engines. One such example is the high pressure turbine blade 10 shown in FIG. 1.

Figure 1:
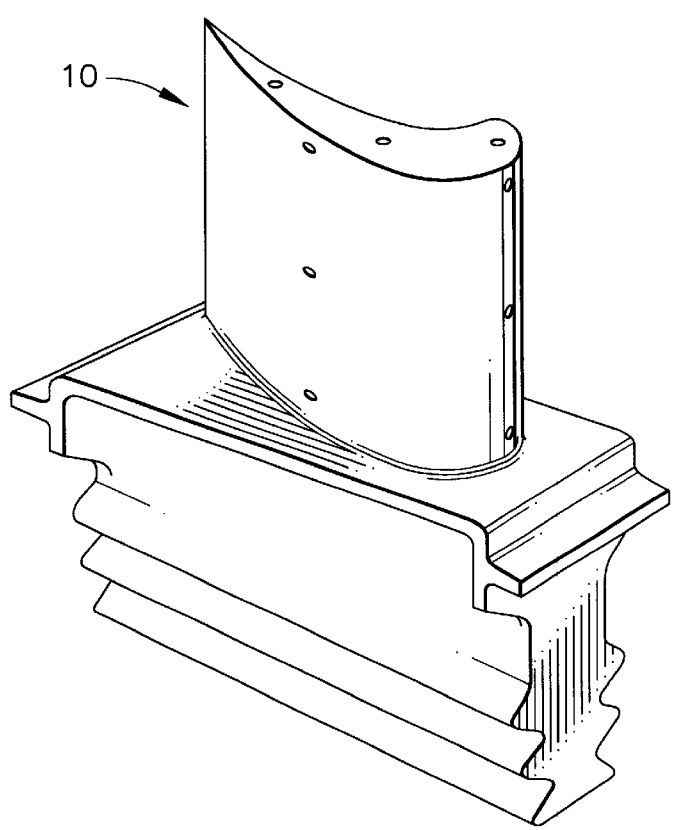
FIG. 1 is a perspective view of a high pressure turbine blade.
Figure 2:
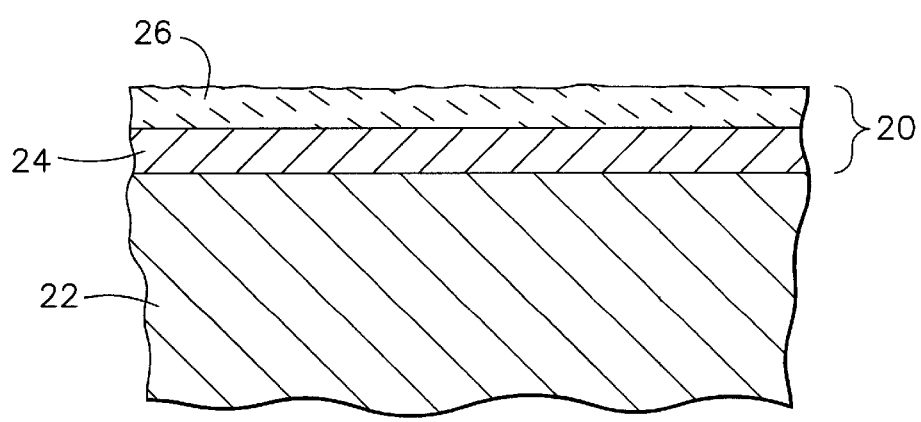
FIG. 2 is a cross-sectional view of the coating system on the blade in FIG. 1.

FIG. 2 is a cross-sectional view of a portion of the turbine blade of FIG. 1. Represented in FIG. 2 is a thermal barrier coating system 20. As shown, the thermal barrier coating system 20 is a dual-layered coating. The dual layered coating is comprised of a ceramic layer 26 adherent to the bond layer 24. The bond layer 24 is adherent to the substrate 22. For example, a typical TBC coating system may comprise an yttria-stabilized zirconia ceramic layer adherent to MCrAl alloy bond layer.

Other components, such as seal teeth, employ coating systems 20 to improve wear characteristics and extend the life of the component. For example, the seal teeth of a gas turbine engine may have a coating system 20 comprising a nickel aluminide bond layer with an aluminum oxide wear layer.

Different techniques requiring a reference standard for measuring a coating system 20 are available. For example, eddy current techniques use the impedance of a solenoid coil placed near the surface of the coating system 20 of the component to be inspected. Eddy current inspection of a coating system 20 is determined by comparison to the characteristics of a known reference standard comprising the same materials as the substrate 22 and coating system 20. That is, the same substrate 22, the same bond layer 24 and the same ceramic layer 26. The coating system 20 of the component is inferred therefrom by comparison of the component inspection with a known reference standard. Another technique is infrared inspection, as claimed in U.S. Pat. No. 4,818,118 and incorporated herein by reference, which applies a controlled amount of laser energy onto the component and measures the radiant thermal energy. Again, the inspection of the unknown component coating system 20 is determined by comparison of the measured component data with known reference standards for the same substrate and coating system.

Figure 3:
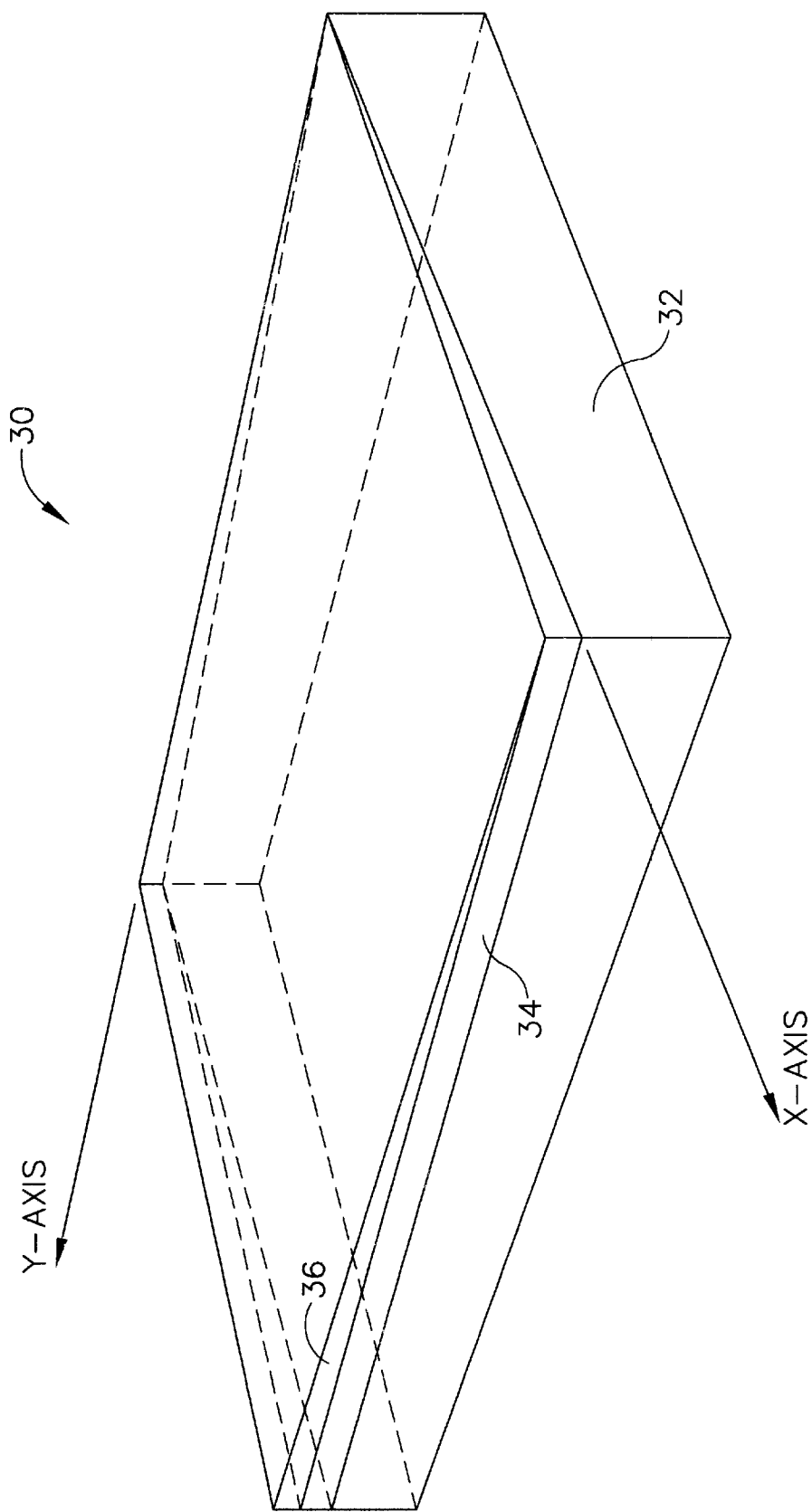
FIG. 3 is a perspective view of a dual-layering reference standard showing a reference bond layer, increasing substantially linearly along the x-axis, deposited on the reference substrate, followed by a adherent reference ceramic layer increasing substantially linearly along the y-axis.

In the exemplary embodiment illustrated in FIG. 3, a dual layered reference standard 30 provides a spectrum of dual coating variances in one sample. FIG. 3 shows a reference substrate 32, of unit dimensions in both the x and y direction, aligned with a Cartesian coordinate system.

Adherent to the reference substrate 32 is a reference bond layer 34. The reference bond layer 34 increases substantially linearly along the X-axis of the reference substrate 32. That is, at x=0 the reference bond layer 34 has minimum thickness of substantially zero and at x=1 the reference bond layer 34 has a desired maximum thickness. In other words, the reference bond layer 34, in general, has a substantially wedge shaped thickness along the x-axis.

Adherent to the reference bond layer 34 is a reference ceramic layer 36. The reference ceramic layer 36 also has a substantially wedge shaped thickness, which is orientated orthogonally to the reference bond layer 34 wedge thickness. In other words, the reference ceramic layer 36 increases substantially linearly along the y-axis of the reference substrate 32. That is, at y=0 the reference ceramic layer 36 has a minimum thickness of substantially zero and at y=1 the reference ceramic layer 36 has a desired maximum thickness.

The desired maximum thickness of each individual layer should be at least as thick as the anticipated maximum thickness of the individual layer of the component to be inspected. Preferentially, the desired maximum thickness of each individual layer should be greater than the anticipated maximum thickness of the individual layer of the component to be inspected.

Thus, the exemplary embodiment comprises a spectrum of variation of the coating system 20. Illustrative of this point is the following summary; (1) at x=0 and y=0 both the bond and ceramic layers are substantially zero (i.e. double thin); (2) at x=1 and y=0 the bond layer has a desired maximum thickness while the ceramic layer is substantially zero (i.e. thick bond layer and thin ceramic layer); (3) at x=0 and y=1 the bond layer is substantially zero and the ceramic layer has a desired maximum thickness (i.e. thin bond layer and thick ceramic layer); and (4) at x=1 and y=1 both the bond and ceramic layers have a desired maximum thickness (i.e. double thick). Therefore, a benchmark is provided for any thickness combination of bond layer and ceramic layer, within the range of the reference standard 30, by using a specific x and y coordinate of the reference standard 30.

The exemplary embodiment is by way of example only and not intended to limit the scope of the invention. For instance, the gradients of the reference bond layer 34 or reference ceramic layer 36 need not begin at zero. The gradients may have any lower thickness limit desired and may increase to any desired maximum thickness. Furthermore, the gradients or the limits for the reference layers need not be the same. That is, each individual layer may employ a desired range specific to the critical limits for that specific layer.

Using the standard reference embodiment described, the effects of different physical combinations can be explored over the continuum of the reference standard. Moreover, inspection no longer must depend on interpolation of data to fill the gaps between many individual reference standards.

While our invention has been described in terms of a preferred embodiment, it is apparent that other forms could be adopted by one skilled in the art. Accordingly, the scope of our invention is to be limited only by the following claims.

What is claimed is:

1. A reference standard method for inspection of dual-layered coatings employed for coating a component, comprising:
    a substrate;
    a first layer adherent to said substrate, wherein the first layer has a predetermined thickness that increases in one direction; and
    a second layer adherent to said first layer, wherein the second layer has a predetermined thickness that increases in a direction orthogonal with the first layer and wherein at least one of said layers has a predetermined thickness variation and the first and second layers can provide a spectrum of dual coating variances to provide a benchmark for any thickness combination of the dual-layered coatings by using a specific x and y coordinates of the reference standard.

2. The component as recited in claim 1, wherein the first layer comprises a predetermined thickness variation.

3. The component as recited in claim 1, wherein the second layer comprises a predetermined thickness variation.

4. The component as recited in claim 1, wherein both the first and second layers comprise a predetermined thickness variation.

5. The component as recited in claim 4, wherein the predetermined thickness variation of the second layer is angled with respect to the predetermined thickness variation of the first layer.

6. The component as recited in claim 4, wherein the predetermined thickness variation of the second layer is substantially orthogonal with respect to the predetermined thickness variation of the first layer.

7. A method of inspecting a dual-layered coating employing the reference standard of claim 1.

8. A method of inspecting a dual-layered coating employing the reference standard of claim 1, comprising the steps of:
   (a) measuring characteristics of the component having dual-layered coating thicknesses; and
   (b) comparing the measured characteristics of the component with data obtained from the reference standard.

9. The method of claim 7 or 8, wherein the inspection comprises eddy current techniques.

10. The method of claim 7 or 8, wherein the inspection comprises infrared techniques.

* * * * *